US011962657B2

(12) United States Patent
Lu et al.

(10) Patent No.: US 11,962,657 B2
(45) Date of Patent: Apr. 16, 2024

(54) SERVICE REACHABILITY DETECTION

(71) Applicant: HEWLETT PACKARD ENTERPRISE DEVELOPMENT LP, Houston, TX (US)

(72) Inventors: Hao Lu, Santa Clara, CA (US); Rahul Bahal, Santa Clara, CA (US); Mohd Shahnawaz Siraj, Santa Clara, CA (US); Kannan Konath, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/872,367

(22) Filed: Jul. 25, 2022

(65) Prior Publication Data
US 2024/0031447 A1  Jan. 25, 2024

(51) Int. Cl.
G06F 15/173 (2006.01)
H04L 12/18 (2006.01)
H04L 41/0654 (2022.01)
H04L 43/08 (2022.01)
H04L 67/51 (2022.01)

(52) U.S. Cl.
CPC .............. *H04L 67/51* (2022.05); *H04L 12/18* (2013.01); *H04L 41/0654* (2013.01); *H04L 43/08* (2013.01)

(58) Field of Classification Search
CPC ..... H04L 67/51; H04L 12/18; H04L 41/0654; H04L 43/08
USPC ........................................................ 709/224
See application file for complete search history.

(56) References Cited

U.S. PATENT DOCUMENTS

| 9,417,831 | B2 | 8/2016 | Evans et al. | |
| 9,930,025 | B2 | 3/2018 | Oberheide et al. | |
| 2015/0256404 | A1* | 9/2015 | Evans | G06F 3/1288 |
| | | | | 709/224 |
| 2015/0358235 | A1* | 12/2015 | Zhang | H04L 47/12 |
| | | | | 370/230 |
| 2018/0227974 | A1* | 8/2018 | Puttagunta | H04L 67/51 |

OTHER PUBLICATIONS

NetBeez, "Network Monitoring for End-User Experience" (Year: 2022).*
Android Developers, "Use Network Service Discovery", Oct. 27, 2021, 9 Pgs.
Cisco, "Aironet Active Sensor Deployment Guide 2.1.2", Mar. 16, 2022, 106 Pgs.
NetBeez," Network Monitoring for End-User Experience", Retrieved Apr. 11, 2022, 14 Pages.

* cited by examiner

*Primary Examiner* — Nicholas P Celani
*Assistant Examiner* — Karina J Garcia-Ching
(74) *Attorney, Agent, or Firm* — Hewlett Packard Enterprise Patent Department

(57) ABSTRACT

Systems and methods are provided for discoverability detection of network services. The present disclosure provides for a cloud-based network insight server that collects performance information of a network and a network agent, communicating with the cloud-based network insight server, that monitors discoverability of network services hosted by devices on the network. The network agent receives configuration information from the cloud-based network insight server and transmits discoverability states of the devices to the cloud-based network insight server based on executing a service discovery process through an access point on the network.

20 Claims, 9 Drawing Sheets

SERVICE REACHABILITY DETECTION

BACKGROUND

The Internet of Things (IoT) can refer to a system or network of devices or items that are provided with unique identifiers that allow them to transfer data over a network. These objects may be embedded with sensors that enable these objects to collect and exchange data. For example, one IoT model connects headless sensors over wireless connections to a cloud service that manages the headless sensors and collects traffic. The wireless connections may be established, for example, over a wireless local area network (WLAN) such as a Wi-Fi® network.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration, these drawings are not necessarily made to scale.

Figure 1A:
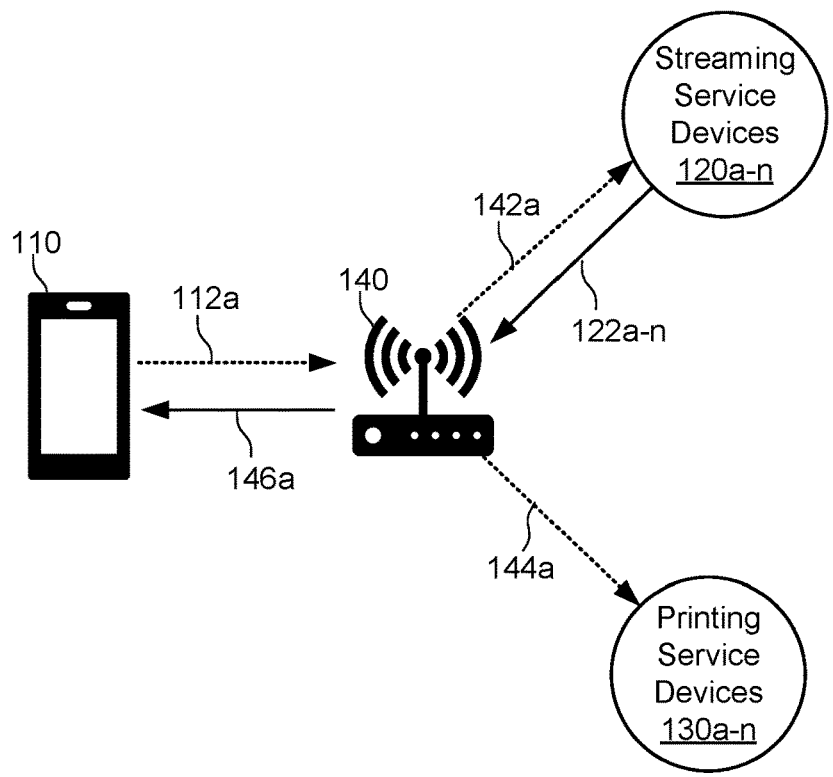
FIGS. 1A and 1B illustrate examples of service discovery process according to zero-configuration networking.

The figures are not exhaustive and do not limit the present disclosure to the precise form disclosed.

DETAILED DESCRIPTION

As noted above, devices such as sensors or devices having sensors embedded therein may connect to an IoT (or other) network via a WLAN, such as a Wi-Fi® network. WLANs, especially enterprise WLANs are often configured to be secure, minimizing open-authentication access points (APs), implementing Wi-Fi® Protected Access (WPA) authentication and encryption protocols, etc. For example, in order for a sensor to connect to its service in the cloud, the sensor may communicate over a Wi-Fi® network, and thus is configured to connect to the Wi-Fi® network through network discovery (e.g., by a Wi-Fi® network's service set identifier (SSID), authentication credentials (e.g., Wi-Fi® network-specific passwords, such as a pre-shared key or WPA authentication), and the identity of the sensor (e.g., a user ID, Media Access Control (MAC) address, or X.509 certificate).

Some sensors may be configured to operate in conjunction with or under the purview of a network insight system that can be cloud-based, for example, the Aruba User Experience Insight (UXI) system, Thousandeyes system, 7signal system, Wyebot system, etc. Given that these sensors are part of a cloud-based network insight system, such sensors may establish wired or wireless connections to/from the network insight system. For example, the sensors may use a ethernet backhaul to connect to the network insight system, from where it can obtain instructions. The instructions may include something such as connecting to a wireless network to perform certain tests. The network insight system may in turn connect to a frontend system, and a network insight dashboard may be accessed through the frontend system. That is, the network insight system may be a "backend" system, and the network insight dashboard system may be a "frontend" system. The network insight system may communicate with remotely located sensors to send configuration information or other data associated with or controlling operation of the sensors. The backend network insight system may receive information or data gleaned by the sensors regarding one or more aspects of a network in which the sensors have been installed as a result of the sensors monitoring and/or testing aspects of the network, applications running on the network, etc. A user, such as a network administrator, may then view or obtain such information or data via the frontend network insight system. Parameters (e.g., operating parameters) or information regarding configuration of the sensor may be set forth using the frontend network insight system.

Some devices connected to the IoT network via the WLAN may host services that can be shared with other devices connected to the WLAN. For example, data streaming devices (e.g., video streaming, audio streaming, et.), such as, but not limited to, Airplay enabled devices such as AppleTV, Fire TV, Roku devices, and Google Chromecast, may host streaming services that may be usable by other devices on the WLAN. Another example service is printing services (such as AirPrint offered by Apple) hosted by network printing devices that is usable by other devices on the WLAN. Other examples of such services includes, but not limited to, as file sharing services (e.g., file transfer protocol (FTP) services, BitTorrent services, Samba, etc.), messaging service, scanning services, services offering remote access between devices on the WLAN (e.g., Secure Shell (SSH) and the like), smart home automation services (e.g., thermostat, fridge, smart sprinkler controllers, etc.), and so on. Such services will be referred to herein collectively as "network services" and the devices that host the network services are referred to herein as "service devices."

Certain sharing mechanisms may be implemented in a WLAN to share network services between services devices and other devices connected to the WLAN. For example, zero-configuration facilitates sharing of network services through a low level network protocol that publishes various types of network services over a local network. Zero-configuration networking enables a service device to announce itself and network services hosted thereby in a simple, easy to understand, and unique name based manner to other devices, connected to the WLAN, wishing to use the network service without any configuration on the part of the end-user or an administrator. Zero-configuration networking protocol employs an auto service discovery process that creates an environment where all network services available on the WLAN are visible, without restriction, to other devices connected to the WLAN.

Example implementations of zero-configuration networking include, but are not limited to, Bonjour promulgated by Apple, Android Digital Living Network Alliance (DLNA), and the like. Bonjour protocol includes service discovery, address assignment, and hostname resolution to locate, on a WLAN, service devices and network services hosted by the service devices using multicast Domain Name System (mDNS) service records. Android DLNA includes similar functionality to locate, on a WLAN, service devices and network services hosted by the service devices using a multicast message approach under the Discovery And Launch protocol (DIAL). In either case, the service discovery protocols operate under the assumption that whenever an application is opened on a device connected to WLAN, a broadcast service discovery request message is sent over the WLAN. Each device on the network receives the broadcast service discovery message, and service devices that host requested network services are to acknowledge the broadcast service discovery request message. Based on receiving response messages acknowledging the request, the client device compiles a list of service devices available that host the requested network service, which are displayed on the client device and can be accessed from the client device for performing the hosted network services. The zero-configuration networking protocol enables discovery and launch services over a WLAN or virtual local-area network (VLAN). That is, the zero-configuration networking protocol provides for utilizing network services over a subnet common between a client device and service devices.

Figure 1B:
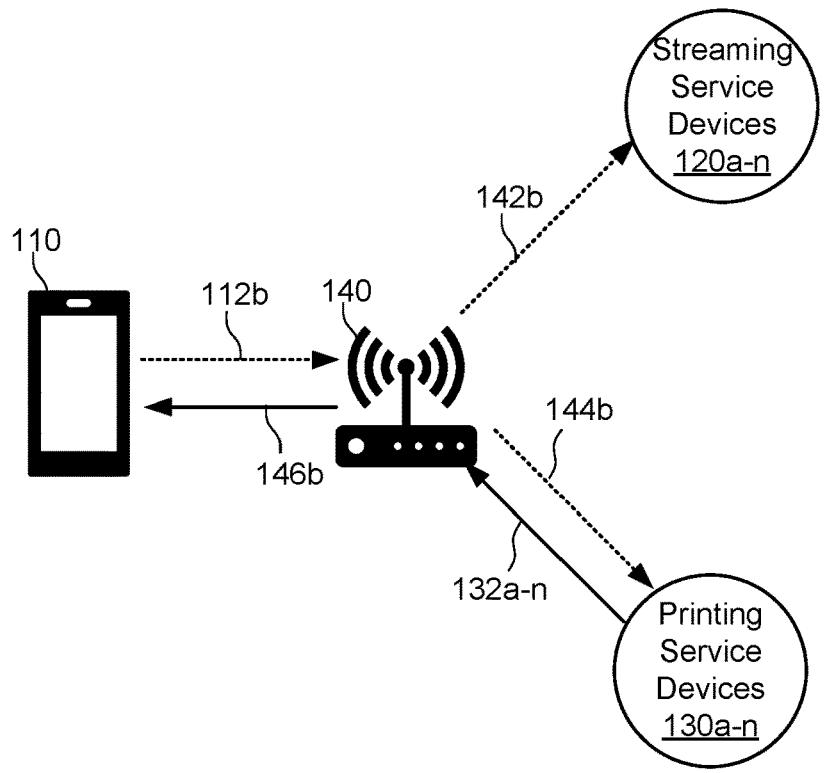

FIGS. 1A and 1B illustrate example service discovery process scenarios in which a client device 110 searches for network services on a local network. Client device 110 is communicably coupled to one or more service devices via a wireless AP 140, such as, but not limited to, streaming service devices 120a-n and printer service devices 130a-n. The AP 140 allows client devices, such as client device 110, to connect to a local network, such as a WLAN and/or VLAN. In one example, the client device 110 sends a service discovery request message 112a to the AP 140 requesting service devices hosting streaming services. The AP 140 broadcasts the request message 142a and 144a to all devices on the network and services devices 120a-n that host the streaming services acknowledge the request message via response messages 122a-n, which includes identifying information of each responding service device 120a-n. The identifying information includes details of how to reach the requested services within the network, such as an Internet Protocol (IP) address, port number, and a server ID (e.g., @ip+port+serverID) corresponding to each service device 120a-n. For example, if the requested services is Airplay services, the response message from service device 120a may indicated that Airplay services are available via IP address 10.1.1.50 at port number 5050, and the service ID may be "myAppleTV1." The AP 140 forwards the responses messages 146a to the client device 110, which compiles a list of service devices 120a-n to display on the client device 110 for performing the requested service (e.g., streaming services in this example). In FIG. 1B, the responses client device 110 sends a service discovery request message 112b to the AP 140 requesting services devices hosting printing services. Thus, services devices 130a-n, hosting printing services, acknowledge the request message via response messages 132a-n, including identifying information (e.g., @ip+port+serverID) of each responding service device 130a-n. The AP 140 forwards the responses messages 146b to the client device 110, which compiles a list of service devices 120a-n to display on the client device 110 for performing the requested service (e.g., printing services in this example).

However, if anything goes wrong with the service discovery process, one or more service devices that host a requested network service may fail to acknowledge or otherwise respond to the request message (e.g., a response message acknowledging the request message is not received by the client device). The result is that unresponsive service devices are not discoverable (e.g., not visible) to the client device. For example, failure to receive a response message may be due to an issue occurring at the service device itself, such as a weak network signal strength (e.g., weak received signal strength indicator or RSSI) resulting in failure to receive the request message at the service device or failure of the client device to receive the response; misconfigurations of network service set identified (SSID) or credentials for authorized access to the local network by the service device; unexpected or expected power loss at the service device; to name a few. In some cases, failure to receive a response message may be due to an issue occurring on a network device that supplies and/or enables communication over the network (e.g., wireless APs, wired switches, mobility/wireless controllers, etc.), such as misconfiguration of firewall policy, WLAN/VLAN, etc.; broadcast and/or multicast filtering by a wireless AP; incorrect policy enforcement on a gateway device, to name a few.

Prompt, efficient and reliable detection of outages in network services may help network administrators to maintain uninterrupted provisioning of network services. For example, if a network printer is not discoverable, the service outage can be detected and reported, before a client device sees the outage in the form of a network services and/or service device absent from the list of available network services/service devices. Conventional systems and methods attempt to detect network service interruption by sending a targeted "ping/keepalive" message directly to each service device and assume the service device is working if a response to the "ping/keepalive" message is received. However, the conventional systems and methods are unreliable because they are unable to detect issues arising at network devices. For example, in a case where a local network is dropping service discovery packets, the broadcast discovery request message could be filtered by a network device (such as a wireless AP) or dropped by the firewall, which results in network services not being discoverable. Yet, conventional systems using a targeted "ping/keepalive" message are unable to detect this interruption because the targeted message may not be filtered or dropped by the network device due to the targeted nature of the "ping/keepalive" message. That is, the targeted "ping/keepalive" message may avoid be subjected to the filtering by the AP or dropping by firewall.

Accordingly, implementations disclosed herein overcome the above technical shortcoming and offer other advantages over the conventional systems by mimicking the service discovery protocol on a WLAN to detect discoverability states of each service device connected to the WLAN through tracking of reception of responses (or lack thereof) from service devices according to the service discovery protocol. For example, implementations disclosed herein utilize a network agent operating to monitor network services and detect services outages, such as those described above, by tracking completion of service discovery processes. The network agent may be executed on a sensor or a device having a sensor embedded therein connected to the WLAN via a wireless AP. The sensor may operate in conjunction with the network insight system to communicate with a backend network insight system. The backend network insight system communicates to a frontend network insight system hosting a network insight dashboard, which provides network performance metrics, gleaned by the sensor, for evaluation by a network administrator. The network agent receives configuration information for controlling operation of the network agent from the backend network insight system. The configuration information includes, among other things, identification information of the WLAN (e.g., a an SSID), indication of at least one network service type (e.g., Airplay, Chromecast, network printing, etc.), and at least one identifier of a service device hosting the indicated network service type (e.g., a Media Access Control (MAC) address, IP address, alphanumeric identifier that can be associated to an IP address using DNS, etc.). Using the configuration information, the network agent executes an auto service discovery procedure, for example, by transmitting a service discovery request message to the AP, which includes an indication of the network service type. The AP broadcasts the service discovery request message over the WLAN to all IoT devices connected thereto. Responsive to the broadcast message, the network agent expects to receive responses acknowledging the request message from service devices on the WLAN that are hosting the network service type identified in the request message. If a response is received from the service device identified in the configuration information, a discoverability state for the identified service device is set to healthy (also referred to as discoverable or visible) by the network agent. If an acknowledgement or response is not received, then the discoverability state is set to unhealthy (also referred to as not discoverable or not visible).

The results may be packaged by the network agent with other metadata, such as performance metrics and troubleshooting logs corresponding to the service device, which are provided to the backend network insight system. The backend network insight system collects network performance metrics, troubleshooting logs, and discoverability states from the network agent and feeds them to the frontend network insight system. A network administrator may use the performance metrics, troubleshooting, and discoverability states to identify and isolate issues on the WLAN. For example, to identify service devices that are having discoverability issues and to assist in identifying where issues are occurring within the WLAN (e.g., at a network device provisioning the network or service device hosting the network service).

By executing and tracking the service discovery process over the WLAN via the network agent, implementations disclosed herein provide serval non-limiting advantages over the conventional systems. For example, implementations disclosed herein are capable of monitoring the service discovery process in a timely manner, such that alerts can be pushed to network administrators as soon a network service outage occurs. For example, the network agent may continuously execute the service discovery process on a periodic basis, and where the period between each broadcast request message is relatively short (e.g., on the order of a few minutes) an outage may be detected before an end-user experiences the outage. Implementations disclosed herein are also capable of performing network troubleshooting techniques prior to executing the service discovery process, such as network reachability detection techniques. Example network reachability detection techniques include, but are not limited to, confirmation that the network agent is able to be authenticated by the WLAN, thereby excluding authentication issues from potential sources of service outage; confirmation that the network agent is able to get an IP address, thereby confirming that DHCP is functional in the WLAN; etc. By executing network troubleshooting techniques prior to the service discovery process, network reachability issues may be detected and excluded as potential source of service outage prior to checking service discoverability. This approach may save troubleshooting effort for network administrator. Furthermore, unlike existing systems which send "ping/keepalive" message directly to service devices, implementations disclosed herein are able to detect potential issues caused by the WI-FI® access, for example, broadcast filtering by the AP and/or packet dropping due to firewall policy, to name a couple.

Figure 2:
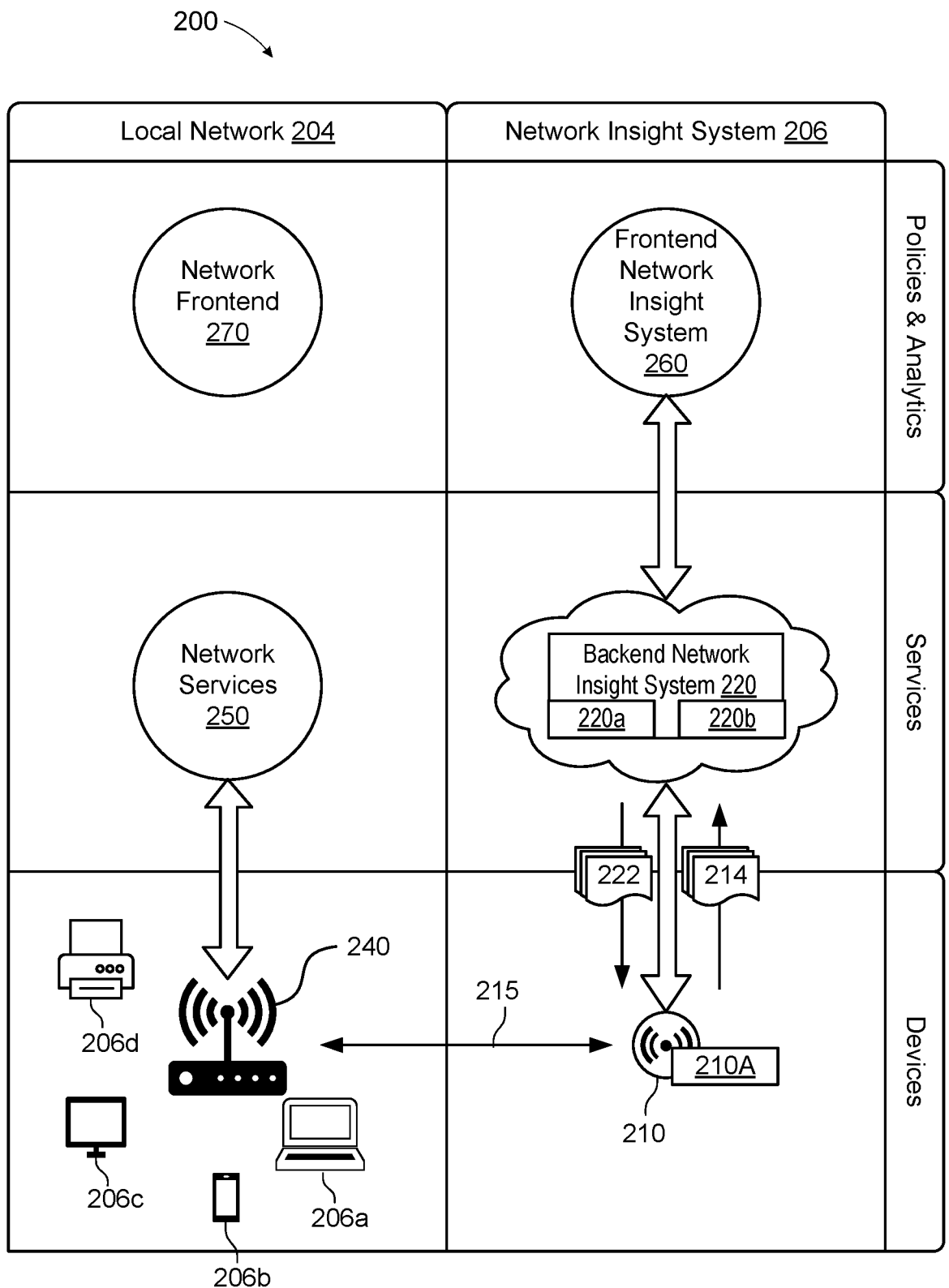
FIG. 2 illustrates an example system architecture in which implementations of the present disclosure may be implemented.

FIG. 2 illustrates an example system architecture 200 and corresponding high-level message flow in which embodiments of the present disclosure may be implemented. System architecture 200 may be logically separated into three layers: a devices layer, a services layer, and end-user layer where policies may be input by end-users (e.g., owners and/or administrators) and analytics may be presented and evaluated. Architecture 200 include a network insight system 202 and a local network 204 (e.g., a WLAN or VLAN system). The network insight system 202 includes a sensor 210. In some embodiments, sensor 210 may be an IoT sensor, which may be a purpose-built sensor and/or embedded in an IoT device (although the applicability of embodiments is not limited to just IoT sensor systems). Sensor 210 includes a network agent 210A installed thereon as executable software codes that are executed by the sensor 210 to operate, after installation, to mimic service discovery processes and monitor the network in which it is installed, as well as perform testing and/or troubleshooting of the network services 250. It should be understood that the network 204 itself can be monitored/tested as well as aspects or elements making up the network, applications or services running on the network, etc.

The network insight system 202 also includes a backend network insight system 220 that may communicate with sensor 210. Backend network insight system 220 may reside in a public, private, or hybrid cloud, and can be implemented as a controller, an independent server, an independent micro service running on a cloud platform, or running on a traditional, independent server. A public cloud may share publicly available resources/services over, e.g., the Internet, while a private cloud is not shared and may only offer resources/services over a private data network. A hybrid cloud may share services between public and private clouds depending on the purpose of the services. Backend network insight system 220 and sensor 210 may communicate under various circumstances. Backend network insight system 220 may transmit configuration information 222 including test protocols in the form of configurations or configuration files to sensor 210 so that sensor 210 may have the requisite information or instructions for monitoring and/or testing a network identified therein. In turn, network-relevant information 214, such as data or information obtained by sensor 210 from the connected network 204, may be transmitted to backend network insight system 220. The backend network insight system 220 may receive the inputs at a frontend network insight system 260, for example, by an end-used (such as network owner or administrator), defining the configuration information. Backend network insight system 220 may be cloud-based, which would be understood by those of ordinary skill in the art to refer to being, e.g., remotely hosted on a system/servers in a network (rather than being hosted on local servers/computers) and remotely accessible. Such a cloud-based system allows the system to be accessible from a variety of places, not just where the system is hosted. Thus, an end-user, using a mobile device or personal computer may have access to a remote network's operating state. It should be noted that the backend network insight system 220 need not reside on the same network in which sensor 210 is installed.

In some embodiments, backend network insight system 220 may include one or more servers, data stores, and the like. Additionally, backend network insight system 220 may include a device gateway 220A and an application programming interface (API) gateway 220B. Device gateway 220A may be a mechanism/interface for communicating with sensor 210, while API gateway 220B may interface with the aforementioned frontend network insight system 260, which may provide access to a dashboard. The dashboard may be hosted by the backend network insight system 220 and accessed via a web portal or hosted locally on the frontend network insight system 260. As will be discussed in greater detail below, backend network insight system 220 may provide information or data from sensor 210 to the frontend network insight system 260 (described below in connection with FIG. 6). In some embodiments, backend network insight system 220 may process, e.g., filter, convert, translate, etc., the information or data obtained by sensor 210 into a format that can be used by or presented via a dashboard 262 of frontend network insight system 260.

The local network 204 includes a plurality of IoT devices 206a-d (collectively referred to herein as "IoT devices 206") connected to the network. IoT devices 206 may include any device connected to and configured to communicate over and with other devices on the network. IoT devices 206 may include, but are not limited to, desktop computers, laptop computers, servers, web servers, authentication servers, authentication-authorization-accounting (AAA) servers, DNS servers, Dynamic Host Configuration Protocol (DHCP) servers, Internet Protocol (IP) servers, Virtual Private Network (VPN) servers, network policy servers, mainframes, tablet computers, netbook computers, televisions and similar monitors, content receivers, set-top boxes, personal digital assistants (PDAs), smart watches, wearable smart devices, mobile phones, smart phones, smart terminals, dumb terminals, virtual terminals, video game consoles, network printers (including scanners, copiers, fax machines, etc.), streaming devices (e.g., AppleTV, AirPlay enabled devices such as audio receiver/speaker equipment, Chromecast devices, Roku devices, FireTV), projectors, home automation systems (e.g., temperature control systems and smart thermostats, smart sprinkler controller systems, etc.) and the like.

One or more of the IoT devices 206 may host network services 250 on the network. For example, IoT device 206c is an example of a video streaming device hosting streaming network services, for example, AppleTV, Chromecast devices, Roku devices, FireTV, etc.). IoT device 206d is an example of a network printer hosting printing services. IoT devices 206 may include a plurality IoT devices hosting a common network service type, for example, multiple video streaming devices and/or multiple network printers may be connected to the network. Other network services may also be hosted by the IoT devices 206, such as audio streaming services, data streaming services, temperature control services, and so on. IoT devices 206 that host network services are referred to herein as service devices, while IoT devices 206 that wish to use network services are referred to as client devices or end-user devices. An IoT device 206 may function as a client device in one scenario, while functioning as a service device in another scenario. For example, a tablet computer may operate as client device that seeks to use streaming services offered by a video streaming device (or seek to use printing services via a network printer), while in another case a mobile phone may be a client device that seeks to use streaming services offered by the tablet computer functioning as a service device.

In order to facilitate communications between the various components or elements of local network 204, local network 204 may include one or more APs, such as AP 240, which may be an example of AP 110 (FIG. 1). In this example, sensor 210 may establish wireless, e.g., 802.11, communications with AP 240. This connection can then be leveraged to allow sensor 210 and backend network insight system 220 to establish communications therebetween. Additionally, the AP 240 may establish wireless communications with one or more of the IoT devices 206. The connection between the AP 240 and the sensor 210 and the connection between the IoT devices 206 and the AP 240 can then be leveraged by sensor 210 to execute network service discoverability testing 215 based on the configuration information 222 from the backend insight network system 220.

Figure 3:
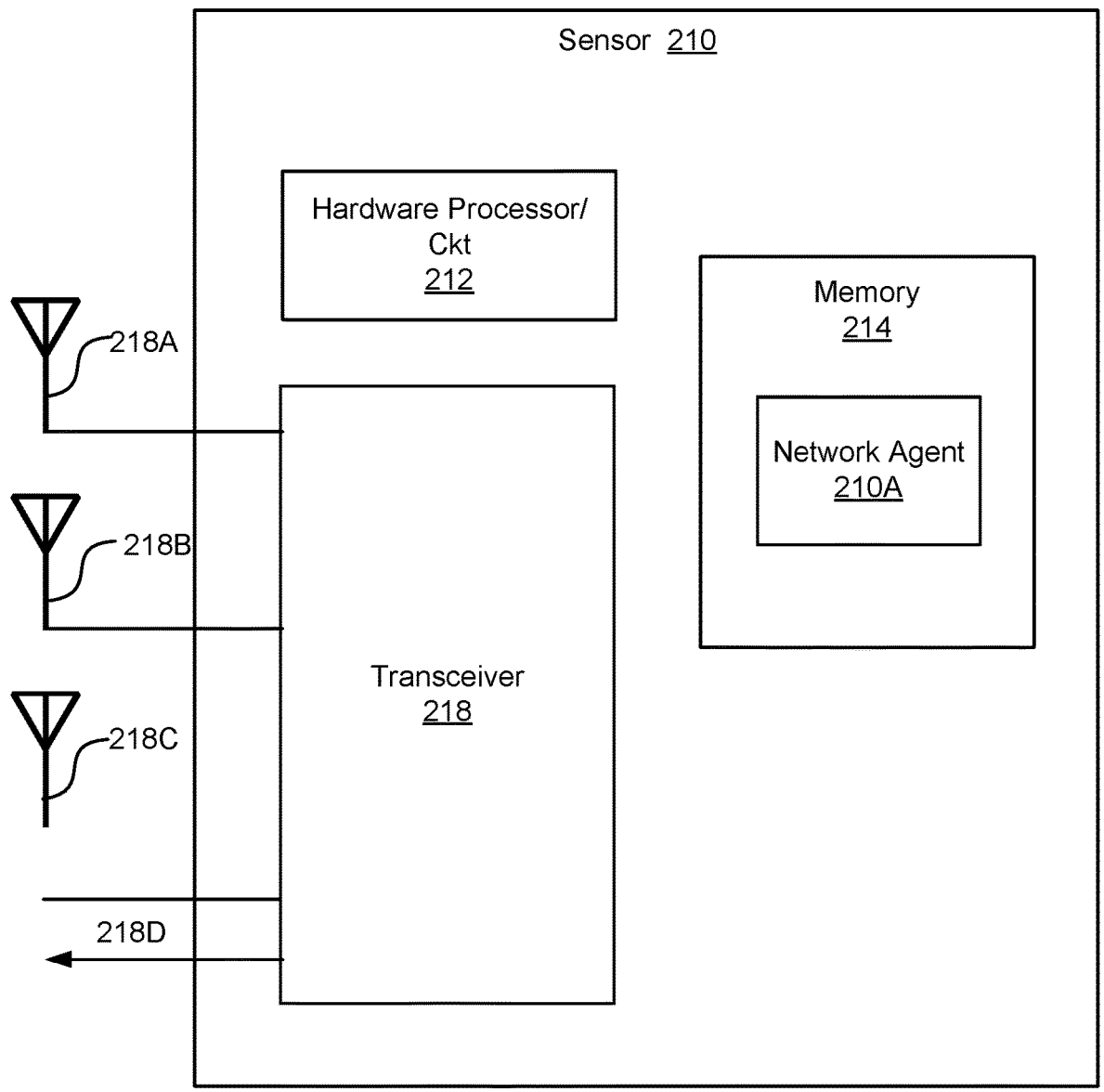
FIG. 3 illustrates an example architecture of a sensor that may be implemented in the system architecture of FIG. 2 in accordance with some implementations of the present disclosure.

FIG. 3 illustrates an example system or device architecture of a sensor, such as sensor 210. Sensor 210 may include a hardware processor 212 and a machine-readable storage medium 214. Hardware processor 212 may be one or more central processing units (CPUs), semiconductor-based microprocessors, and/or other hardware devices, such as circuits, suitable for retrieval and execution of instructions stored in machine-readable storage medium, 214. A machine-readable storage medium, such as machine-readable storage medium 214, may be any electronic, magnetic, optical, or other physical storage device that contains or stores executable instructions. Thus, machine-readable storage medium 214 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 214 may be a non-transitory storage medium, where the term "non-transitory" does not encompass transitory propagating signals. Machine-readable storage medium 214 may be encoded with executable instructions for performing the aforementioned network agent 210A in the form of including network service discoverability testing and network health monitoring logic and/or algorithms. Sensor 210 may further comprise one or more transmitters or receivers for transmitting/receiving information or data, referred to in FIG. 3 as transceiver 218. Devices, such as sensor 210 may support various connectivity mechanisms, including wireless connection mechanisms. Accordingly, operatively connected to transceiver 218 are one or more antennas for communicating vis-à-vis such connectivity mechanisms, e.g., antennas 218A, 218B, and 218C. Each of antennas 218A, 218B, or 218C may support a particular wireless connectivity mechanism, while an interface 218D may support wired connectivity. For example, to support Ethernet communications, interface 218D may comprise a wired Ethernet port.

Figure 4:
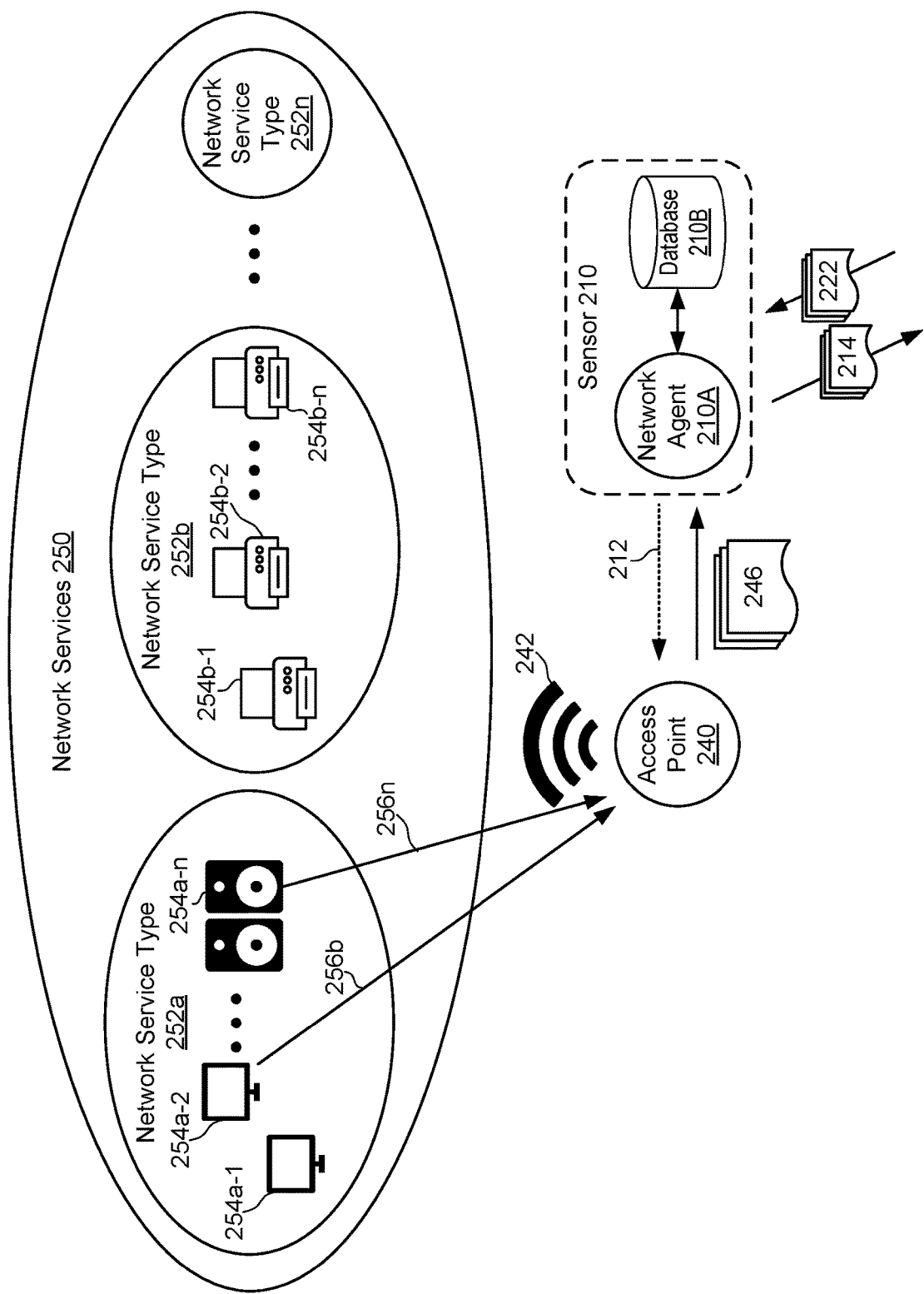
FIG. 4 illustrates an example high-level message flow performed for network service discoverability detection in accordance with implementations of the present disclosure.

FIG. 4 illustrates an example high-level message flow performed for network service discoverability testing 215.

FIG. 4 will be described in conjunction with FIG. 5, which illustrates an example method 500 or set of operations that may be performed by the sensor 210 to test network service discoverability and monitor the network.

Referring to FIG. 4, a portion of the system architecture 200 of FIG. 2 is illustrated. Particularly, network services 250 of FIG. 2 are shown comprising a plurality of network service types 252a-252n (collectively referred to herein as "network service types 252"), each hosted on one or more service devices. For example, network service type 252a is illustratively hosted on service devices 254a-1 through 254a-n (collectively referred to herein as "service devices 254a") and network service type 252b is illustratively hosted on service device 254b-1 through 254b-n (collectively referred to herein as "service devices 254b"). In this example, network service type 252a may be streaming network services hosted on streaming service devices 254a and network service type 252b may be network printing services hosted on printer devices 254b. In some examples, a first network service type may be streaming network services over Airplay, a second network service type may be streaming network services over Chromecast, a third type of another streaming network service, and so on. Service devices, such as service devices 254a and 254b, may be one or more of IoT devices 206 of FIG. 2 connected to the local network 204 via wireless AP 240.

Figure 5:
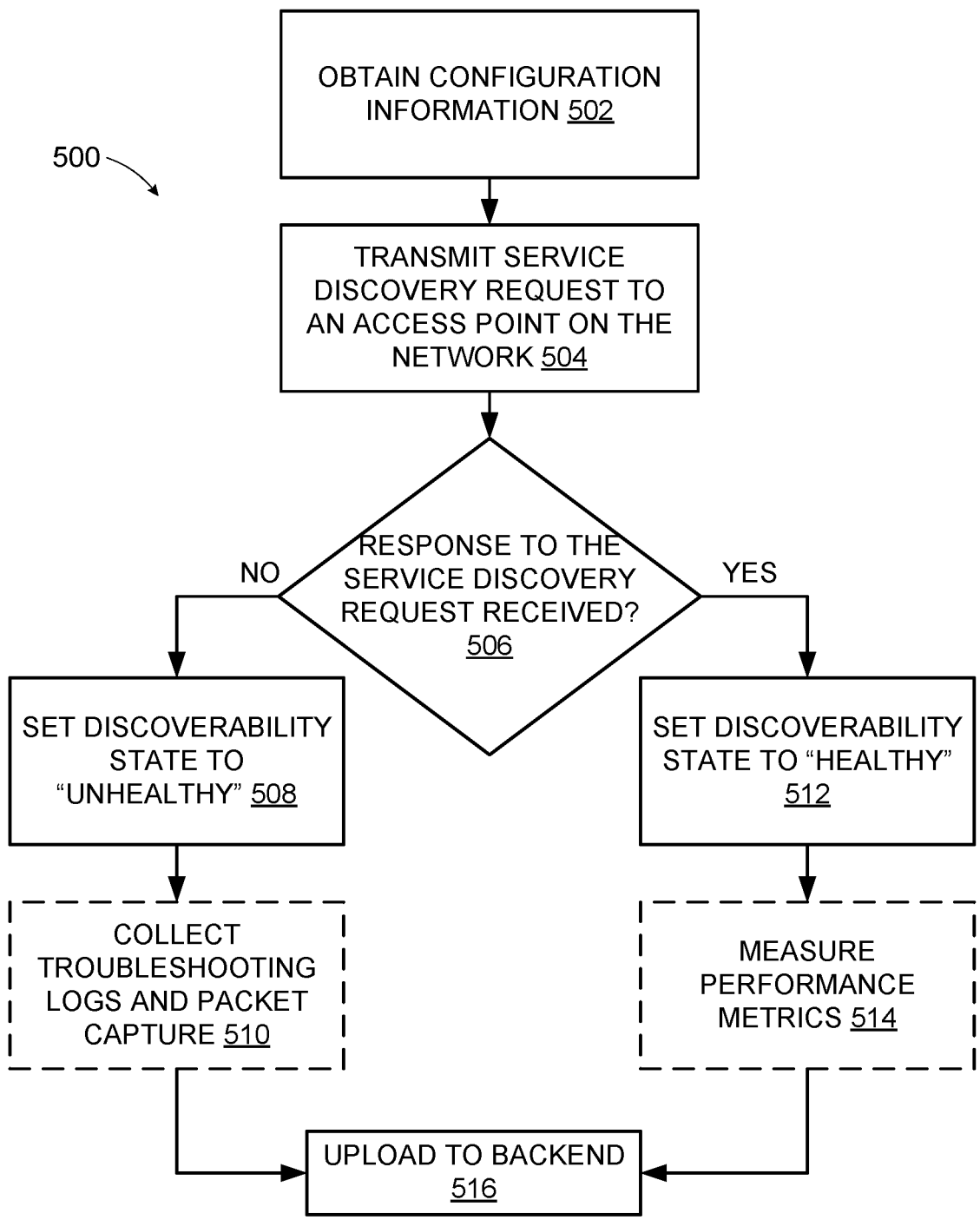
FIG. 5 illustrates an example method for network service discoverability detection in accordance with implementations of the present disclosure.

Once a connection between the sensor 210 and the backend insight system 220 is established, with reference to FIGS. 4 and 5, configuration information 222 may be pushed to the sensor 210 (for example, by the backend network insight system 220) and downloaded thereby, for example, by the network agent 210A at block 502. That is, network agent 210A may access or download configuration information 222 comprising one or more configurations or configuration files that may be the basis for monitoring and testing of network 204. Accordingly, at block 502, the sensor 210 (particularly, the network agent 210A) can download any requisite configuration(s). The configuration information 222 may include one or more test protocols in the form of configurations or configuration files. Each configuration includes information that identifies a local network, a network service type, and service device. The information identifying the local network may be provided as a SSID. In some examples, the information identifying the local network may include authentication credentials (e.g., password or the like), which may be provided as encrypted code that can be decoded only by the network agent and fetched in a secure way by the network agent The information identifying the service type may include a listing of the service type to be tested, for example, Airplay®, Chromecast, or other network service type. The information identifying the service type may also include the server name (e.g., "myAppleTV1" referred to the above example) The information identifying the service device may be provided as any means of identifying an IoT device connected to the local network 204, for example, (MAC) address, IP address, alphanumeric identifier that can be associated to an IP address using DNS, etc.). In some examples, each configuration of configuration information 222 may be specific to one network service type offered on the local network identified by the configuration information 222. In this case, each configuration of the configuration information 222 identifies the local network and the network service, as well as identifies of each service device that hosts the identified network service. In another example, each configuration of the configuration information 222 may be specific to each service device, and in this case provides an identifier of the service device on the network to be tested, and an identification of each network service offered thereby. In yet another example, each configuration may identify a single network service and a single service device.

Based on the configuration information 222, the network agent 210A then mimics the service discovery process, such as those described in connection with FIGS. 1A and 1B. In some cases, responsive to downloading, storing, and processing the configuration information 222, the network agent 210A connects to the local network identified in the configuration information 222 (unless the network agent 210A is already connected thereto). For example, the network agent 210A may connect to one or multiple networks, in the case that the configuration information 222 identify more than one networks, via the SSID and the authentication credentials.

When connected to the identified local network, for example, local network 204 in this example, the network agent 210A transmits a service discovery request message 212 (e.g., a multicast request message according to zero-configuration networking protocols) to the AP 240 requesting service devices hosting network services identified in the configuration information 222 at block 504. The AP 240 broadcasts the request message 242 to all IoT devices 206 on the network. The IoT devices that host the identified network services (e.g., the service devices of the identified network service) should acknowledge the request message via response messages, which should include identifying information (e.g., @ip+port+serverID) of the responding service device. The AP 240 then forwards the response message to the sensor 210, which are received by the network agent 210A as messages 246 at block 506. For example each message 256 may be forwarded as message 246 to the network agent 210A. Based on the response messages 256 forwarded as messages 246, the network agent 210 sets a discoverability state in a discoverability database 210B for each service device 254 identified in the configuration information 222 at blocks 508 and 512. The discoverability states, in association with the identifying information of the service devices, are then uploaded to the backend network insight system 220 at block 516.

For example, in the illustrative example shown in FIG. 4 and with reference to FIG. 5, configuration information 222 may be received by the network agent 210A identifying the local network 204 (e.g., via an SSID for the network 204) and identifying the network service type 252a (e.g., streaming services, such as Airplay) (block 502). The configuration information 222 also identify service device 254a hosting the network service type 252a. The network agent 210A sends a service discovery request message 212 requesting network services (block 504). The AP 240 broadcasts the request message 212 as broadcast request message 242 to all IoT devices 206 on the network 204. Responsive to receiving the broadcast request message 242, each service device 254a should acknowledge the request message 212 via a corresponding response message 256, which includes identifying information (e.g., @ip+port+serverID) of the respective service device 254. For example, service devices 254a-2 (e.g., AppleTV) and 254a-n (e.g., Airplay enabled speakers) transmits response messages 256a and 256n to the AP 240 according to the service discovery process.

The AP 240 then forwards the response message, including response messages 256a and 256n, to the network agent 210A as messages 246 (block 506). Based on the messages 246, the network agent 210 the sets a discoverability state for each service device 254a. For example, in response to messages 246 including response messages 256b and 256n, the network agent 210 sets the discoverability state of the service devices 254*a*-2 and 254*a*-*n* to healthy (also referred to as discoverable and/or visible) (block 508). In some examples, the network agent 210 verifies identifying information included in the response messages 256*b*-256*n* (e.g., provided as messages 246) against identifying information in the configurations. For example, the network agent 210 confirms that the information identifying the service device in the messages 256*b*-256*n* matches information identifying the service device in the configuration, that the service types match, and that the server names match.

However, as shown in FIG. 4, a response message corresponding to service device 254*a*-1 may not have been received by the AP 240. Thus, in response determining that messages 246 lacks a response message corresponding to service device 254*a*-1, the network agent 210 sets the discoverability state of the service device 254*a*-1 unhealthy (also referred to as not discoverable and/or not visible) (block 512). Additionally, if the identifying information included in one of messages 256*b*-*n* does not match the configurations, the network agent 210 may set the discoverability state of corresponding one of service devices 254*b*-1 through 254*b*-*n* to unhealthy. In this way, a discoverability state of all service devices 254*a* identified in the test protocol 222 can be set based on whether a corresponding response message 256 is received at the AP 240 or not. Within database 210B, the discoverability state for each service device 254*a* is associated with the identifying information of the respective service device 254*a* to provide for tracking and monitoring the discoverability of the respective service device 254*a*.

According to various example, the method 500 may be executed by the sensor 210 continuously on a periodic basis. For example, the sensor 210 may initiate method 500, for example, by performing block 504 every preset time period. The time period may be set as desired for each network, for example, the method 500 may be initiated and a service discovery request message 212 transmitted by the network agent 210A once every 10 minutes, every 5 minutes, every 1 minute, etc. The shorter the period, the quicker the network agent 210A can detect a recent service outage prior to an end-user experiencing the outage.

In various example, the service discovery request message 212 may comprise a message identifier, for example, in a header of a data packet, and the service discovery request message in a payload of the data packet. The message identifier and payload are logged in the database 210B for later retrieval and reference. Upon receiving the broadcast request message 242 of service discovery message 212, each service device 254*a* unpacks the message identifier from the header and the request message from the payload. Each service device 254*a* then packages the message identifier from the service discovery message 212 and an acknowledgement message into a payload of the corresponding response message 256. Upon receipt of each response message 256, the AP 240 forwards each response message 256 to sensor 210 as messages 246. The network agent 210A then unpackages each message 246 (e.g., each response message 256) to extract the message identifier and acknowledgement message of the response message 256. The network agent 210A confirms that the response message 256 forwarded as message 246 corresponds to the request message 212 by aligning a message identifier extracted from the response message 256 to a message identifier stored in the database 210B. In this way, the network agent 210A confirms that a response message 256 was received from a respective service device 254*a* acknowledging the service discovery request 212, and sets the discoverability state for the respective service device 254*a* to healthy.

In various examples, the network agent 210A may be configured to measure and collect additional performance metrics of the service devices, of the network service type, and/or the local network 204 at optional (as indicated by the dashed lines) blocks 510 and 514. In some implementations, along with setting a discoverability state to healthy, the network agent 210A may measure one or more network performance metrics (optional block 510). The performance metrics are stored in the database 210B in association with the identifying information of responsive service device(s), which can be uploaded to the backend network insight system 220 at block 516.

An example performance metric may be a roundtrip time between sending a service discovery request message 212 and receiving a response message 256 at the network agent 210A. For example, the network agent 210A may track an amount of time between sending the service discovery request message 212 and receiving message 246 as a response message 256 for the service discovery request message 212. For example, each service discovery request message 212 may be timestamped and stored in database 210B. Each response message 256, forwarded as message 246, may also be timestamped as to when the response message 246 is received by the network agent 210. The network agent 210A may compare the timestamp of the request message 212 to a timestamp of the message 246, corresponding to the response message 256, to determine the roundtrip time for which a response for a given request is received (e.g., a response including a message identifier of a request). The roundtrip time for a response may be an example metric of the performance of the network 204, for example, if the roundtrip time is less than or equal to a first threshold (e.g., 1 second or less) the network may be considered adequate for provisioning of the network services identified in the configuration information 222. Whereas, if the roundtrip time is greater than or equal to a second threshold (e.g., 2 or 3 seconds or more) the network may be considered inadequate for provisioning the network services network services identified in the configuration information 222. If the roundtrip time falls between the first and second thresholds, then the network may be adequate under certain operating conditions (e.g., low traffic, client/service devices within close proximity of the AP 240, etc.) for provisioning the network services identified in the configuration information 222.

Figure 6:
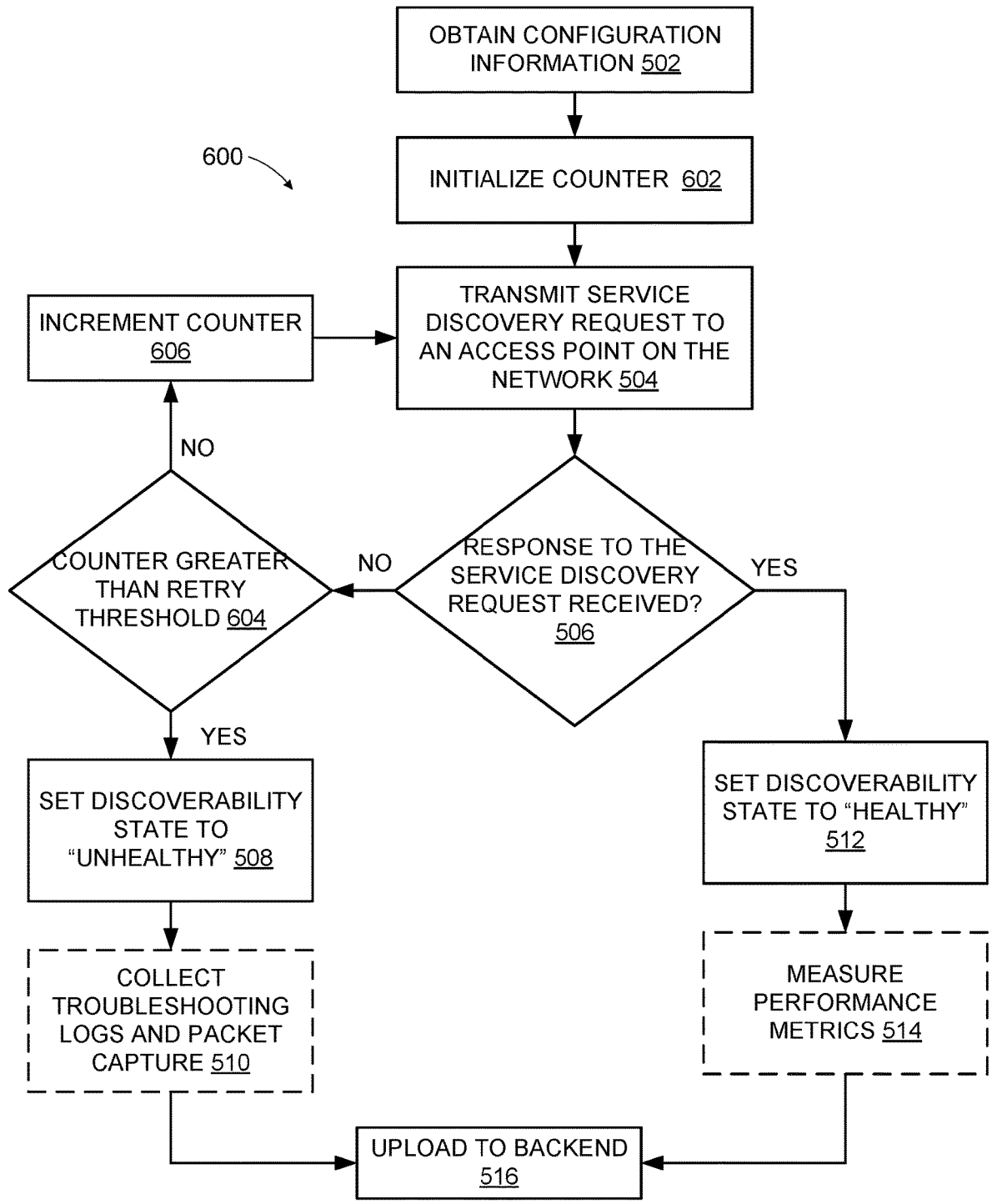
FIG. 6 illustrates another example method for network service discoverability detection in accordance with implementations of the present disclosure.

As another example performance metric, the network agent 210A may be configured to track a number of service discovery request messages are sent before a response message 256 is received. For example, FIG. 6 illustrate an example method 600 or set of operations that may be performed by the sensor 210 to test network service discoverability and track responses to service discovery requests. Some of the operations of FIG. 6 are the same as blocks 502-516 of FIG. 5. FIG. 6 illustrates an implementation for tracking a number of service discovery request retries between a first service discovery request message and an eventual response message received in response to the first service discovery request message.

As described above, at block 502 the sensor 210 can download any requisite configuration(s). At block 602 a counter is initialized for the downloaded configuration by setting a counter to 0. At block 504, as described above, the network agent 210A transmits a first service discovery request 212 to the access point 240. At block 506, the network agent 210A determines whether or not a response message 256 for the first service discovery request 212 is received (e.g., within message 246). In some implementations, the network agent 210A may wait a threshold amount of time for a response to be received before making a determination at block 506, for example, three seconds in some implementations but any threshold amount of time may be used as desired by a network administrator or owner. If the determination at block 506 is YES, method 600 proceeds as described above in connection with block 512 and 514. If NO, the network agent 210A determines whether the counter is greater than a retry threshold at block 604. The retry threshold may be set as desired by a network administrator or owner of the network 204, for example, to 10 retries in some implementations. If the counter does not exceed the threshold, then the counter is incremented at block 606 and the network agent 210A retransmits the service discovery request as a second service discovery request message 212. The second service discovery request message 212 may include a payload having the same service discovery request as the first service discovery request message 212, but with a message identifier unique to the second service discovery request message 212. Blocks 506, 604, 606, and 504 are repeated until either a response message 256 to the first service discovery request message 212 is received at the network agent 210A (e.g., determination of yes at block 506) or the counter exceeds the retry threshold (e.g., determination of yes at block 604).

In the case of a determination of yes at block 506, the network agent 210A sets the discoverability state of the service device 254a to healthy at block 512. At block 514, the network agent 210A stores the counter value in association with the service device 254a. The counter value is representative of a number of retries between the first service discovery request message 212 and reception of the corresponding response message 256. While any number of retries may be indicative of an issue with the network 204 (e.g., low network signals, dropping packets, etc.), a larger number of retries is indicative of an increasingly poor connection or increasingly problematic issue on the network 204, such that the network 204 may not be adequate for the network services identified in the configuration. Thus, the presence of retries (and more particularly increasing number of retries) can be provided to network administrators and/or owners via the frontend network insight system 260 to assist in locating and addressing network issues. In some cases, since a response message 256 is eventually received, this may be indicative that the service device 254a is operating as expected, which can be leveraged to narrow down sources of service outages within the network.

In the case of a determination of yes at block 604, the network agent 210A sets the discoverability state of the service device identified in the configuration information 222 to unhealthy at block 508, as described above.

While some example performance metrics are provided above, the network agent 210A may be configured to measure any network metric known in the art, responsive to receiving messages 246 indicting one or more responsive (e.g., healthy) service devices. For example, the network agent may be configured to measure the delay between sending message 212 and receiving message 246 as forwarded message 256, which may indicate how fast the service device can respond to the network agent 210 via the network 204.

At optional block 510 of FIGS. 5 and/or 6, along with setting a discoverability state to unhealthy, the network agent 210A may perform troubleshooting protocols to monitor and identify a source of the service outage of the unresponsive service device(s). For example, the network agent 210A may check if the interface status is up/down; check if 8021x is connected (if applicable); check if WI-FI is associated; check if Dynamic Host Configuration Protocol (DHCP) is successful (e.g., confirm transmission/reception of DHCPDISCOVER message, DHCPOFFER message, DHCPREQUEST message, and DHCPACK message); check reachability of network devices, such as a gateway device; etc. Additionally, the counter value described in connection with FIG. 6 may be included in the troubleshooting log as an indication as how many retries occurred and that a response was still not received. The network agent may be configured to perform any network troubleshooting procedures as known in the art, responsive to receiving message(s) 246 indicting one or more unresponsive (e.g., unhealthy) service devices. Results of executed troubleshooting procedures are compiled into a troubleshooting log and stored in the database in association with the identifying information of unresponsive service device(s).

In either case, the network agent 210 packages any performance metrics and/or troubleshooting logs with the discoverability state of each service device identified in the configuration information 222. This data is then uploaded to the backend network insight system 220 as network-relevant information 214 at block 516. In the case of unhealthy service device(s), the network-relevant information 214 is indicative of a network issues. The backend network insight system 220 collects network performance metrics associated with health service device(s) and network issues from the unhealthy service devices and forwards the information the frontend network insight system 260, as monitoring or testing information/data (as described in connection with FIG. 7).

Figure 7:
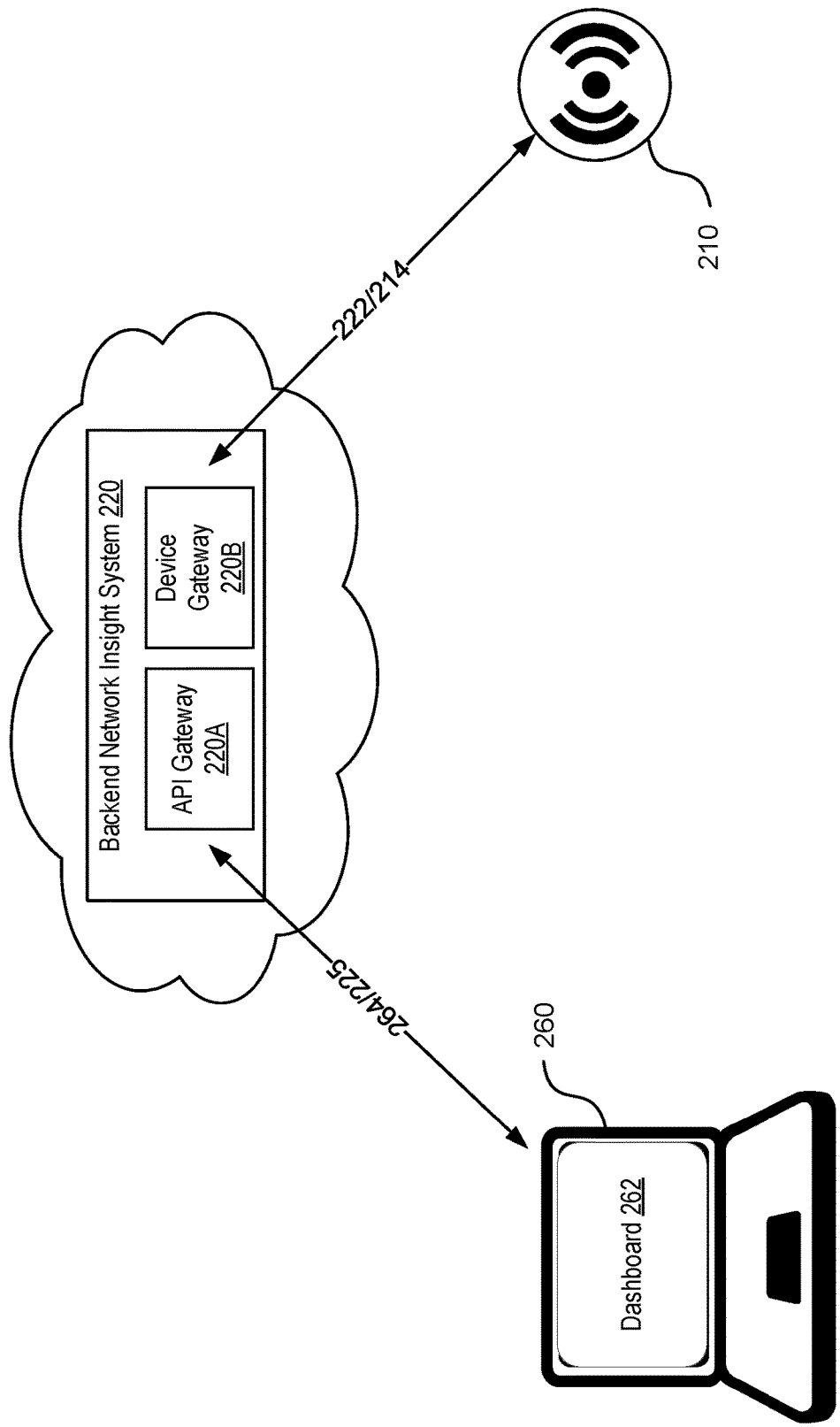
FIG. 7 illustrates an example sensor communicating with a network insight system in accordance with some implementations of the present disclosure.

FIG. 7 illustrates an example of sensor 210 communicating monitoring/test information or data to backend network insight dashboard system 220 on or in which a frontend network insight system 260 may be implemented or presented, e.g., to an end-user. For example, an owner or administrator of local network 204 may have an interest in determining the current status/state of local network 204, applications running thereon, network services running thereon, IoT devices connected thereto, etc. In this regard, the owner or administrator may define configuration information such as configurations or configuration files via dashboard 262, for example, by selecting one or more network service types (e.g., one or more network service types 252) and service devices hosting the selected network service types (e.g., service devices 254). Once set, the configuration information can be uploaded from the frontend network insight system 260 to the backend network insight system 220 as configuration information 264.

After establishing a Wi-Fi® connection, sensor 210 may connect to backend network insight system 220 via device gateway 220B. In particular, backend network insight system 220 may transmit configuration information such as the configuration information 222 to sensor 210 and sensor 210 may transmit monitoring or testing information/data 214 to backend network insight system 220. The API gateway 220A of backend network insight system 220 may then forward or transmit the monitoring or testing information/data 225 to frontend network insight system 260 The monitoring or testing information/data may be presented to a user via dashboard 262 of frontend network insight system 260. The frontend network insight system 260 may be a computer, workstation, laptop, or other computing/processing system or component capable of receiving and presenting such information/data, such as, for example, computer system 900 described below in connection with FIG. 9.

Figure 8:
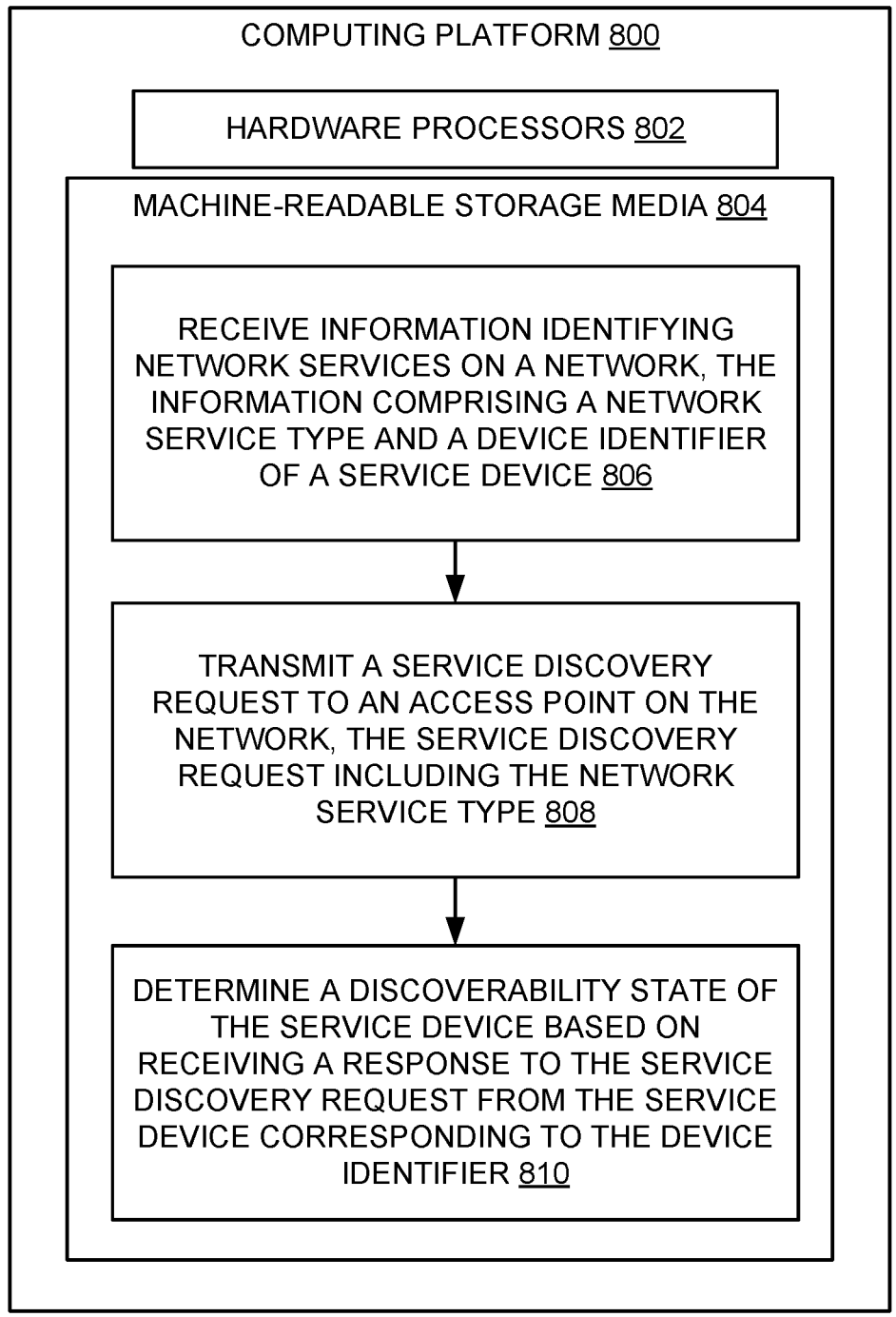
FIG. 8 is an example computing component that may be used to implement network service discoverability detection in accordance with the implementations of the present disclosure.

FIG. 8 illustrates an example computing component that may be used to implement burst preloading for available bandwidth estimation in accordance with various embodiments. Referring now to FIG. 8, computing component 800 may be, for example, a server computer, a controller, or any other similar computing component capable of processing data. In the example implementation of FIG. 8, the computing component 800 includes a hardware processor 802, and machine-readable storage medium for 804. The computing component 800 may be an example implementation of a sensor 210.

Hardware processor 802 may be one or more central processing units (CPUs), semiconductor-based microprocessors, and/or other hardware devices suitable for retrieval and execution of instructions stored in machine-readable storage medium 804. Hardware processor 802 may fetch, decode, and execute instructions, such as instructions 806-810, to control processes or operations for burst preloading for available bandwidth estimation. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 804 may be a non-transitory storage medium, where the term "non-transitory" does not encompass transitory propagating signals. As described in detail below, machine-readable storage medium 804 may be encoded with executable instructions, for example, instructions 806-810. Instructions 806-810 may be an example implementation of a network agent 210A installed on a sensor 210 according to the implementations disclosed herein.

Hardware processor 802 may execute instruction 806 to receive information identifying network services on a network, the information comprising a network service type and a device identifier of a service device. For example, the hardware processor 812 may receive configuration information in the form of configuration(s) or configuration files defining test protocols. As described above, the configuration information includes an identification of a network service type and one or more service devices, as well as an identification of a local network. Execution of instruction 806 may be based on, or in response to, receiving the configuration information from a backend system, such as backend network insight system 220 described above.

Hardware processor 802 may execute instruction 808 to transmit a service discovery request to an access point on the network, the service discovery request including at least the network service type. For example, as described above, instructions 808 may be executed to mimic a service discovery process to request network services hosted by service devices connected to the local network (e.g., the local network identified in the configuration information). As described above, responsive to the service discovery request transmitted at instructions 808, service devices hosting the identified network service should transmit a response message, including device identifying information, to the access point, which is received by the computing platform 800 as forwarded by the access point.

Hardware processor 802 may execute instruction 810 to determine a discoverability state of the service device based on receiving a response to the service discovery request from the service device corresponding to the device identifier. For example, as described above, the hardware processor 802 may set a discoverability state of a service device to discoverable in response to receiving a response message from the service device. In another case, as described above, the hardware processor 802 may set a discoverability state of a service device to not discoverable in response to determining that a response message was not received from the service device.

Figure 9:
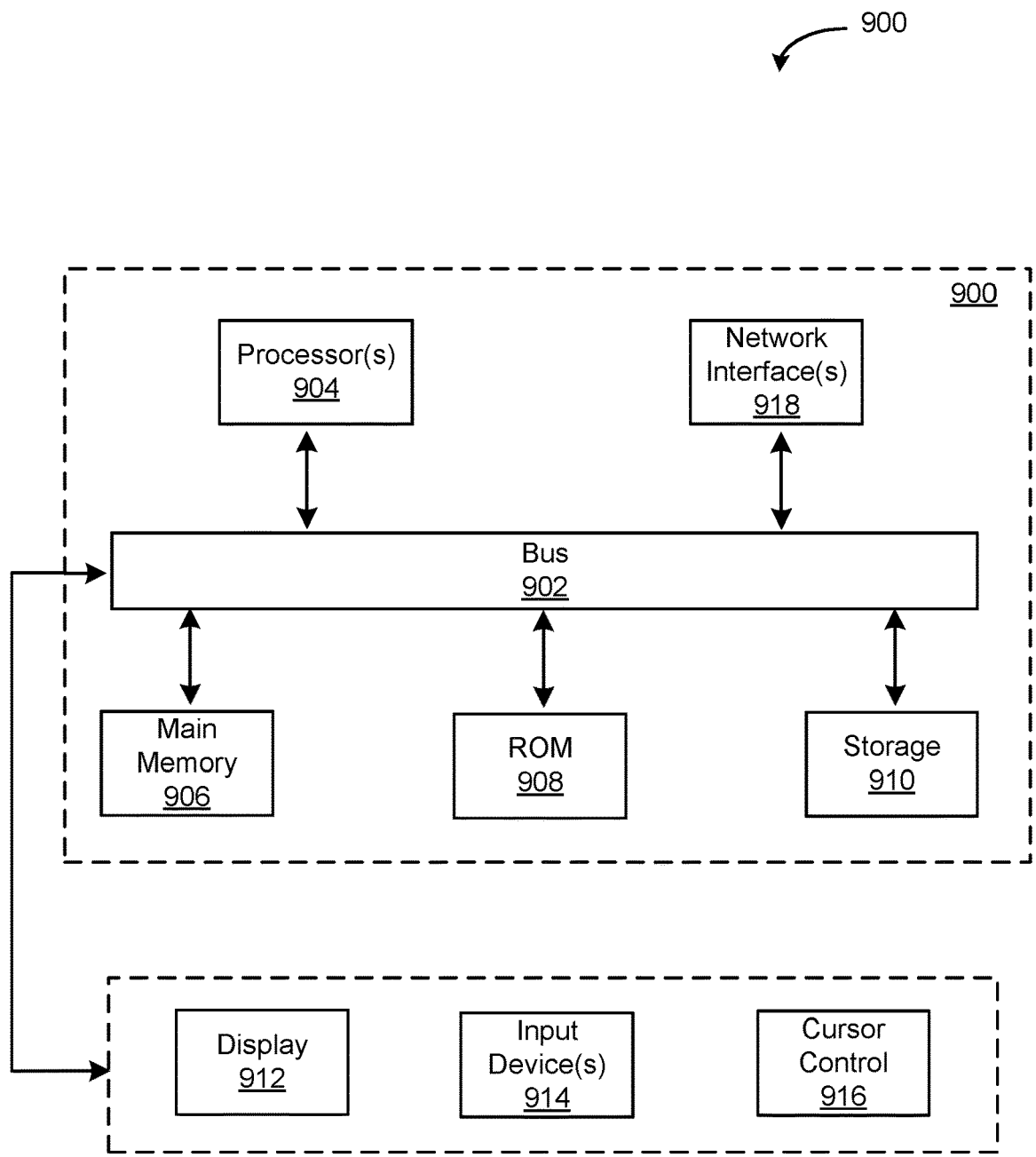
FIG. 9 is an example computer system that may be used to implement network service discoverability detection of the present disclosure.

FIG. 9 depicts a block diagram of an example computer system 900 in which various of the embodiments described herein may be implemented. Computer system 900 may be an embodiment of sensor 210, AP 240, backend network insight system 220, and frontend network insight dashboard system 226, as well any one or more of other components connected to system architecture 200 (e.g., connected to local network 204 and/or system 206). The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for service discoverability detection, the method comprising:
   receiving, by a network agent from a backend server, information identifying network services on a network, the information comprising a network service type and a device identifier of a service device;
   transmitting, by the network agent, a service discovery request to an access point on the network based on the information received from the backend server, the service discovery request including the network service type;
   measuring, by the network agent, one or more network performance metrics;
   setting, by the network agent, a discoverability state of the service device based on the one or more network performance metrics exceeding a threshold associated with the one or more network performance metrics, the network agent setting a second discoverability state if the one or more network performance metrics do not exceed the threshold; and
   determining, by the network agent, that the service device is discoverable based on the discoverability state.

2. The method of claim 1, wherein determining, by the network agent, that the service device is discoverable is in response to receiving the response to the service discovery request.

3. The method of claim 2, further comprising measuring, by the network agent, one or more network performance metrics based on receiving the response to service discovery request.

4. The method of claim 1, further comprising determining, by the network agent, that the service device is not discoverable in response to not receiving the response to the service discovery request.

5. The method of claim 4, further comprising executing, by the network agent, one or more troubleshooting procedures for the network based on the determination that the service device is not discoverable.

6. The method of claim 1, further comprising transmitting, by the network agent, the discoverability state of the service device to the backend server, wherein the backend server transmits the information identifying network services to the network agent.

7. The method of claim 1, wherein in the service discovery request is a multicast message.

8. The method of claim 7, wherein the multicast message is one of a multicast Domain Name System message, a multicast Discovery And Launch protocol message, a multicast Bonjour protocol message.

9. A sensor operable on a network, comprising:
   a processor; and
   a memory operatively connected to the processor and including instructions that when executed, cause the processor to:
      receive, from a backend server, configuration information identifying network services on a local area network, the configuration information comprising a network service type and a device identifier of a service device;
      transmit a service discovery request to an access point on the local area the network based on the configuration information received from the backend server, the service discovery request including the network service type;
      measure one or more network performance metrics;
      set a discoverability state of the service device based on the one or more network performance metrics exceeding a threshold associated with the one or more network performance metrics, the sensor setting a second discoverability state if the one or more network performance metrics do not exceed the threshold; and
      determine that the service device is discoverable based on the discoverability state.

10. The sensor of claim 9, wherein the instructions cause the processor to determine determining that the service device is discoverable is in response to receiving the response to the service discovery request.

11. The sensor of claim 10, wherein the instructions cause the processor to measure one or more network performance metrics based on receiving the response to service discovery request.

12. The sensor of claim 9, wherein the instructions cause the processor to determine that the service device is not discoverable in response to not receiving the response to the service discovery request.

13. The sensor of claim 12, wherein the instructions cause the processor to execute one or more troubleshooting procedures for the local area network based on the determination that the service device is not discoverable.

14. The sensor of claim 9, wherein the instructions cause the processor to transmit the discoverability state of the service device to the backend server, wherein the backend server transmits the information identifying network services to the sensor.

15. A network insight system, comprising:
   a cloud-based network insight server executing a dashboard application presenting performance information regarding one or more aspects of a network;
   a sensor monitoring discoverability of network services hosted by at least one service device on the network and communicating with the cloud-based network insight server, the sensor having received configuration information from the cloud-based network insight server, transmitting a discoverability state of the at least one service device to the cloud-based network insight server, and determining that the at least one service device is discoverable based on the discoverability state, the discoverability state being determined by measuring one or more network performance metrics and setting the discoverability state of the service device based on the one or more network performance metrics exceeding a threshold associated with the one or more network performance metrics, the sensor setting a second discoverability state if the one or more network performance metrics do not exceed the threshold; and
   a network device establishing wireless communications between the sensor and the at least one service device and through which the sensor executes the service discovery process.

16. The network insight system of claim 15, wherein the cloud-based network insight server comprises a first gateway operatively communicating with the sensor, and a second gateway operatively communicating with a remote computer accessing the dashboard application.

17. The network insight system of claim 15, wherein the sensor determines the discoverability states of the at least one service device as healthy in response to receiving at least one response message from the at least one service device according to the service discovery process.

18. The network insight system of claim 17, wherein the sensor measures one or more network performance metrics based on the at least one response message, wherein the one or more aspects of the network comprises the one or more network performance metrics.

19. The network insight system of claim 15, wherein the sensor determines the discoverability states of the at least one service device as unhealthy in response to not receiving at least one response message from the at least one service device according to the service discovery process.

20. The network insight system of claim 19, wherein the sensor performs one or more troubleshooting procedures on the network responsive to not receiving the at least one response message, wherein the one or more aspects of the network comprises a log of the troubleshooting procedures.

* * * * *